(12) United States Patent
Zribi et al.

(10) Patent No.: US 7,573,578 B2
(45) Date of Patent: Aug. 11, 2009

(54) MICRO-ELECTROMECHANICAL SYSTEM FABRY-PEROT FILTER MIRRORS

(75) Inventors: Anis Zribi, Rexford, NY (US); Glenn S. Claydon, Wynantskill, NY (US); David C. Hays, Niskayuna, NY (US); Stacey Kennerly, Niskayuna, NY (US); Long Que, Rexford, NY (US); Shankar Chandrasekaran, Tamil Nadu (IN); Shivappa Goravar, Karnataka (IN); Ayan Banerjee, Karnataka (IN)

(73) Assignee: GE Homeland Protection, Inc., Newark, CA (US)

( * ) Notice: Subject to any disclaimer, the term of this patent is extended or adjusted under 35 U.S.C. 154(b) by 170 days.

(21) Appl. No.: 11/502,189

(22) Filed: Aug. 10, 2006

(65) Prior Publication Data
US 2007/0279641 A1 Dec. 6, 2007

Related U.S. Application Data

(63) Continuation-in-part of application No. 11/447,779, filed on Jun. 6, 2006.

(51) Int. Cl.
G01B 9/02 (2006.01)
(52) U.S. Cl. .................................. 356/454; 356/519
(58) Field of Classification Search ................. 356/454, 356/480, 519
See application file for complete search history.

(56) References Cited

U.S. PATENT DOCUMENTS

| | | | |
|---|---|---|---|
| 6,590,710 B2 * | 7/2003 | Hara et al. | 359/579 |
| 6,674,065 B2 | 1/2004 | Atia et al. | |
| 6,836,366 B1 * | 12/2004 | Flanders et al. | 359/578 |
| 6,836,597 B2 | 12/2004 | Chan | |
| 6,915,048 B2 * | 7/2005 | Kersey et al. | 385/50 |
| 7,276,699 B2 * | 10/2007 | Essex | 250/338.4 |
| 2002/0072015 A1 | 6/2002 | Miller et al. | |
| 2002/0085810 A1 * | 7/2002 | Lee et al. | 385/39 |
| 2002/0091324 A1 | 7/2002 | Kollias et al. | |
| 2002/0168136 A1 | 11/2002 | Atia et al. | |
| 2002/0181849 A1 | 12/2002 | Flanders | |
| 2003/0020865 A1 * | 1/2003 | Hoke | 349/198 |
| 2003/0071216 A1 | 4/2003 | Rabolt et al. | |
| 2003/0085196 A1 | 5/2003 | Coppeta | |
| 2003/0108306 A1 | 6/2003 | Whitney et al. | |
| 2003/0139687 A1 | 7/2003 | Abreu | |
| 2003/0161374 A1 | 8/2003 | Lokai | |
| 2004/0213507 A1 * | 10/2004 | Liu | 385/15 |
| 2005/0030533 A1 * | 2/2005 | Treado | 356/326 |
| 2005/0030545 A1 * | 2/2005 | Tuschel et al. | 356/454 |
| 2005/0094964 A1 * | 5/2005 | Sato | 385/147 |
| 2007/0153288 A1 * | 7/2007 | Wang et al. | 356/454 |

OTHER PUBLICATIONS

Ariel Lipson and Eric Yeatman, "MEMS Photonic Band Gap Filters", Imperial College London, Optical and Semiconductor Devices, Microsystems, Optical. [Retrieved Apr. 7, 2006]. Retrieved from Internet: URL: http://www3.imperial.ac.uk/opticalandsemidev/microsystems/optical/memsphotonicbandga.. 3 pgs.

* cited by examiner

*Primary Examiner*—Tarifur Chowdhury
*Assistant Examiner*—Jonathan M Hansen
(74) *Attorney, Agent, or Firm*—Joseph J. Christian

(57) ABSTRACT

According to one embodiment, a micro-electrical mechanical system apparatus includes first and second mirrors that define a cavity. Moreover, a photonic band-gap structure coats a surface of at least one of the first or second mirrors to improve reflectivity. Another embodiment includes a third mirror, wherein the second and third mirrors form a second cavity. The spaces between the mirrors might comprise, for example, a pair of Fabry-Perot filter cavities for a spectrometer.

16 Claims, 12 Drawing Sheets

MICRO-ELECTROMECHANICAL SYSTEM FABRY-PEROT FILTER MIRRORS

CROSS-REFERENCE TO RELATED APPLICATIONS

This is a continuation-in-part application of application Ser. No. 11/447,779, entitled "MICRO-ELECTROMECHANICAL SYSTEM FABRY-PEROT FILTER CAVITY" and filed on Jun. 6, 2006. The entire contents of that application are incorporated herein by reference.

BACKGROUND

Devices may sense the presence (or absence) of particular molecules. For example, a miniature or hand-held spectrometer might be used to detect biological, chemical, and/or gas molecules. Such devices might be useful, for example, in the medical, pharmaceutical, and/or security fields. By way of example, a hand-held device might be provided to detect the presence of explosive materials at an airport.

In some sensing devices, light reflected from a sample of molecules is analyzed to determine whether or not a particular molecule is present. For example, the amount of light reflected at various wavelengths might be measured and compared to a known "signature" of values associated with that molecule. When the reflected light matches the signature, it can be determined that the sample includes that molecule.

In some sensing devices, a Fabry-Perot filter, or etalon, such as the one illustrated in FIG. 1 is used to analyze light reflected from a sample of molecules. The filter 100 includes a first partially reflecting mirror 110 and a second partially reflecting mirror 120 that define a resonant cavity C. Broadband light enters the filter 100, and some photons reflect off of the first mirror 110 while others pass through the mirror 110 and enter the cavity C. While in the cavity C, the photons bounce between the first and second mirrors 110, 120, and eventually some of the photons pass through the second mirror 120 and exit the filter 100.

As the photons bounce within the cavity C, interference occurs and an interference pattern is produced in light exiting the filter 100. As a result, light having a specific wavelength may exit the filter 100. Note that the interference occurring within the cavity C is associated with the distance d between the two mirrors 110, 120. Thus, the filter 100 may be "tuned" to output a particular wavelength of light by varying the distance d between the mirrors 110, 120 (e.g., by moving at least one of the mirrors 110, 120). By measuring light reflected from a sample using various distances d (i.e., at various wavelengths), and comparing the results with a known signature of values, a spectrometer associated with the Fabry-Perot filter 100 may determine whether or not a particular molecule is present in a sample.

One figure of merit associated with the Fabry-Perot filter's transmission bandwidth is "finesse," which can be defined as FSR/FWHM where FSR represents the free spectral range of the Fabry-Perot filter 100 and FWHM is the width of the transmission peak at its 50% point.

The finesse of the Fabry-Perot filter 100 may be a function of the reflectivity (R) of the mirrors 110, 120. For an ideal etalon or interferometer, finesses may be associated with $\pi(R)^{1/2}/(1-R)$. Note that imperfections in the optical surfaces of the mirrors 110, 120 errors in parallelism between the mirrors 110, 120, and inclusions and imperfections in any material between the reflective surfaces of the mirrors 110, 120 may reduce the finesse of the Fabry-Perot filter 100.

To achieve proper performance for some applications, the filter 100 may need to have a relatively large finesse (e.g., to detect trace amounts of a substance). For example, to achieve a resolution of less that 5 centimeters (cm)−1 and a tuning range of more than 100 nanometers (nm) for a spectrometer, the finesse of the filter 100 may need to be relatively large (e.g., in excess of 100). Moreover, relatively small distances d may increase the need for high finesses and highly reflective mirrors 110, 120.

Because finesse is associated with $\pi(R)^{1/2}/(1-R)$, one way of increasing it's value to increase the reflectivity R of the mirrors 110, 120. For example, mirrors 110, 120 that are very reflective (e.g., 99%) may provide a relatively large finesse. In some cases, however, the mirrors 110, 120 may be formed of silicon, which has a relatively poor reflectance of approximately 25%. The mirrors 110, 120 could be coated with gold or silver to improve performance these materials might only improve the reflectance of the mirrors 110, 120 to approximately 98%—which might not be sufficient for some applications.

SUMMARY

According to some embodiments, first and second mirrors define a cavity. Moreover, a photonic band-gap structure is formed on a surface of at least one of the first or second mirrors. The cavity might be associated with, for example, Fabry-Perot filter.

Some embodiments comprise: means for forming a first vertical mirror in a wafer; means for forming a second vertical mirror in the wafer, first and second vertical mirrors defining a Fabry-Perot cavity; means for growing a layer of a relatively low index substance for the first vertical mirror; and means for growing a layer of a relatively high index substance for the first vertical mirror.

In other embodiments, first and second mirrors define a first cavity. A third mirror is also provide such that a second cavity is defined between the second and third mirrors. These cavities might be associated with, for example, Fabry-Perot filter.

Still other embodiments comprise: means for reflecting light off of an analyte sample into a first Fabry-Perot filter formed in a silicon wafer; means for transmitting light from the first Fabry-Perot filter into a second Fabry-Perot filer formed in the silicon wafer; and means for analyzing light output from the second Fabry-Perot filter to determine information about the analyte sample.

Yet other embodiments may be associated with a spectrometer having a laser source and an analyte sample to reflect light from the laser source. A Fabry-Perot filter cavity to receive the reflected light may include: (i) an actuator within a plane, (ii) at least one movable mirror oriented substantially normal to the plane, wherein the actuator is to move the movable mirror, (ii) a fixed mirror oriented substantially normal to the plane and substantially parallel to the movable mirror, and (iii) a one-dimensional photonic band-gap structure on a surface of at least one of the movable or fixed mirrors. A detector may detect photons exiting the Fabry-Perot filter cavity over time as the movable mirror is moved by the actuator. A decision unit may also be provided to determine if the analyte sample is associated with at least one type of molecule based on the sensed photons.

DETAILED DESCRIPTION

Figure 1:
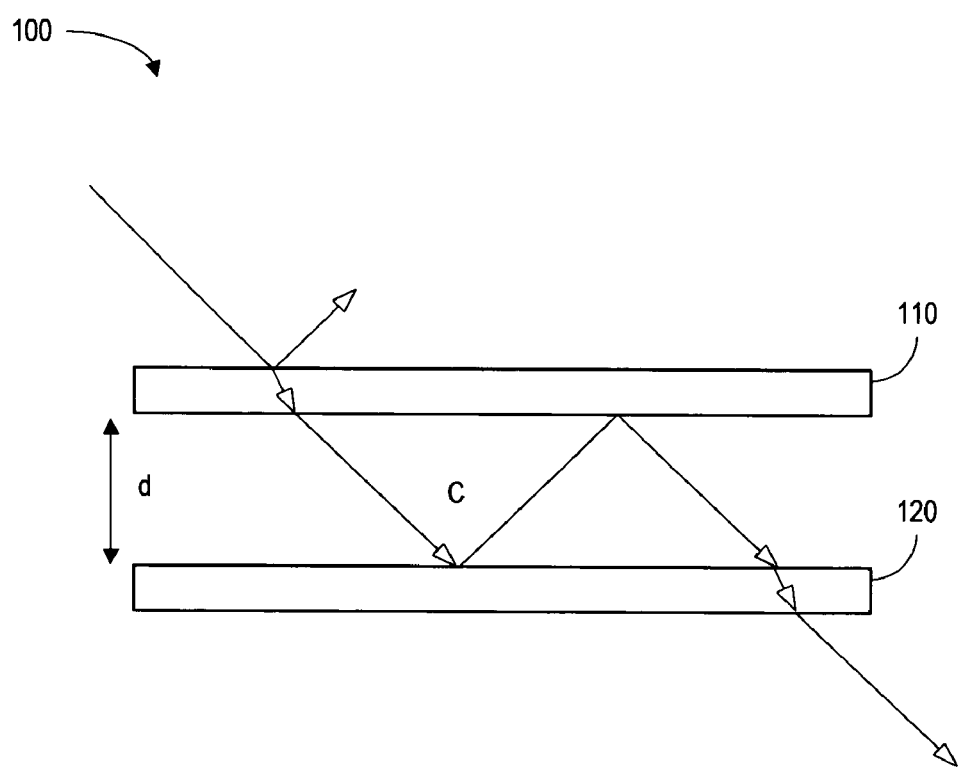
FIG. 1 is a side view of a Fabry-Perot filter.
Figure 2:
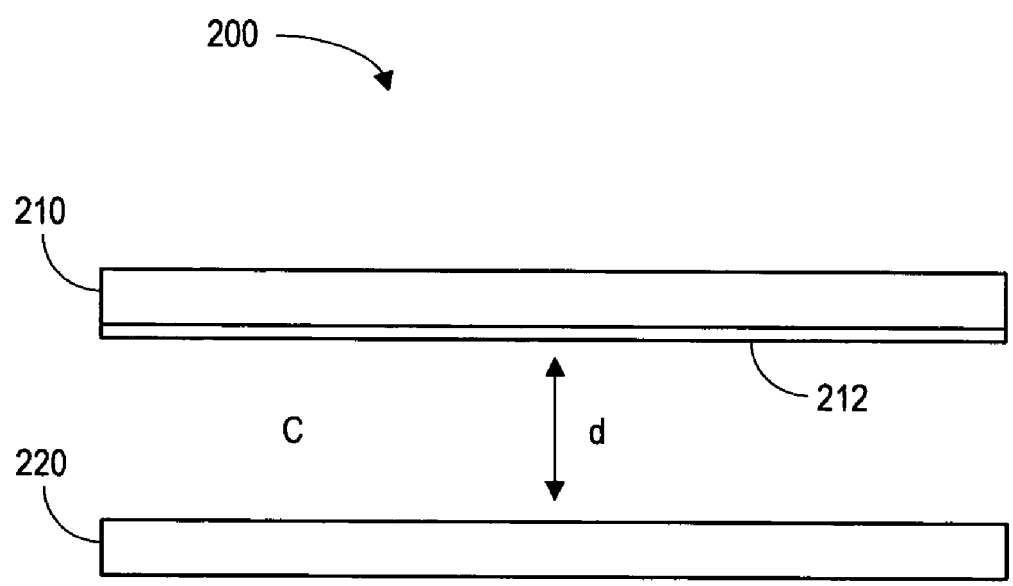
FIG. 2 is a is a side view of a Fabry-Perot filter in accordance with an exemplary embodiment of the invention.

FIG. 2 is a is a side view of a Fabry-Perot filter 200 in accordance with an exemplary embodiment of the invention. The filter 200 includes two mirrors 210, 220 that define a cavity C. Moreover, a coating 212 is provided on one of the mirrors 210 to improve reflectivity.

According to some embodiments, the coating 212 is a "photonic band-gap structure" on a surface of the mirror 210. As used herein, the phrase "photonic band-gap structure" may refer to, for example, any material associated with a band-gap that inhibits the propagation of photons. The coating 212 might comprise, for example, a one-dimensional photonic band-gap structure associated with a "Bragg mirror." As used herein, the phrase "Bragg mirror" may refer to, for example, a Bragg reflector or a quarter-wave mirror formed by creating the coating 212 with alternating sequences of optical materials (e.g., high and low refractive index materials). Moreover, each optical layer thickness may be associated with one quarter of the wavelength for which the mirror 210 is designed. Interfaces between the two materials can contribute a Fresnel reflection, and, as a result, a group delay dispersion of the mirror 210 may be reduced at the design wavelength (e.g., which could improve the reflectivity of the mirror 210 to substantially 99%).

Figure 3:
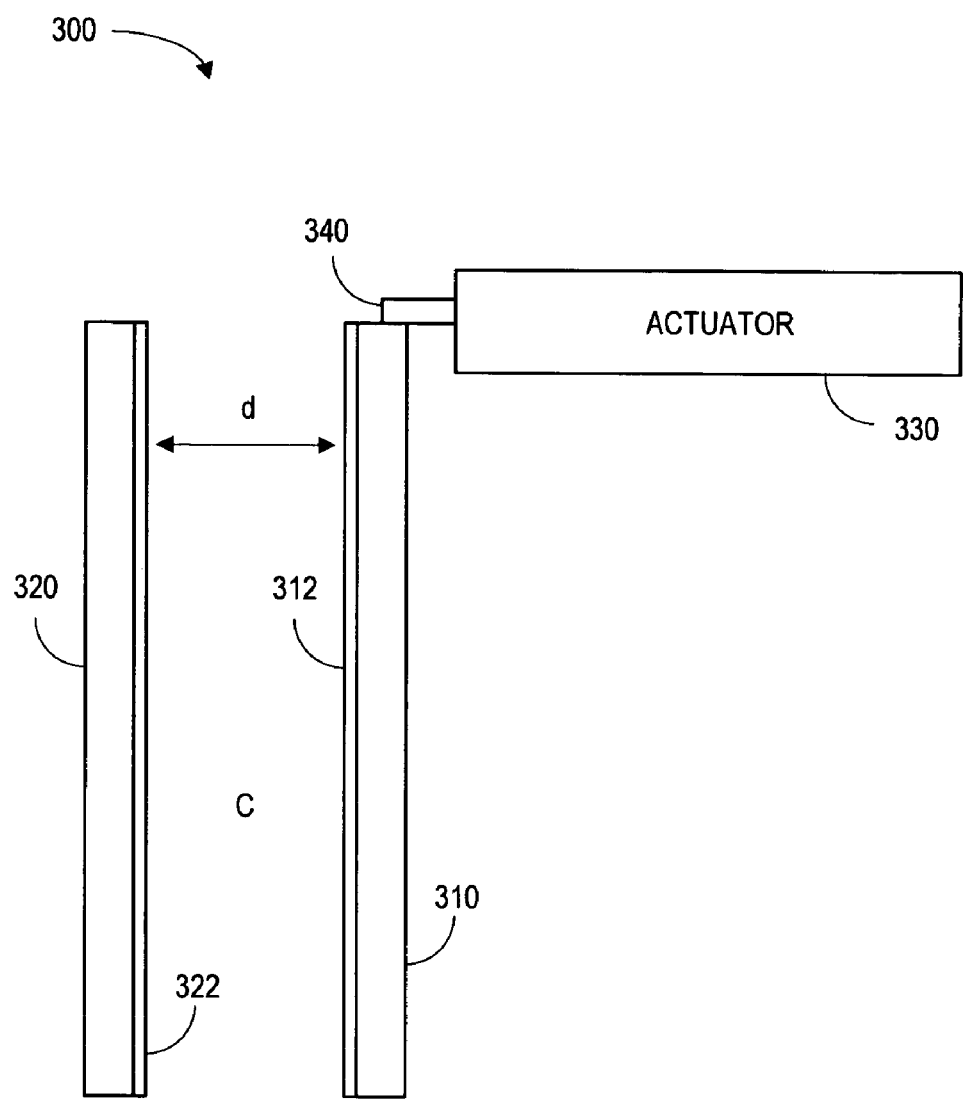
FIG. 3 is a side view of a Fabry-Perot filter in accordance with another exemplary embodiment of the invention.

FIG. 3 is a side view of a Fabry-Perot filter 300 in accordance with an exemplary embodiment of the invention. The filter 300 includes a first partially reflecting mirror 310 and a second partially reflecting mirror 320 that define a resonant cavity C. The first mirror 310 acts a movable mirror while the second mirror 320 is fixed. Note that the movable mirror 310 may be substantially parallel to the fixed mirror 320. According to this embodiment, both mirrors 320 have coatings 312, 322 associated with photonic band-gap structures to improve the finesse of the filter 300.

The filter 300 further includes an actuator 330 within a plane, such as a plane defined by a surface of a silicon wafer. Note that the movable and/or fixed mirrors 310, 320 may be oriented substantially normal to that plane (e.g., vertically within the wafer).

According to some embodiments, the actuator 330 is coupled to the movable mirror 310 via an attachment portion 340. Moreover, the actuator 330 may move or "scan" the movable mirror 310 left and right in FIG. 3 to vary distance d over time.

As the movable mirror 310 is scanned, broadband light may enter the filter 300 (e.g., via fiber optic cable introducing the light through the fixed mirror 320) and some photons may reflect off of the fixed mirror 310 while others pass through the mirror 320 and coating 322 and enter the cavity C. While in the cavity C, the photons may reflect between the coatings 312, 322 of the fixed and movable mirrors 310, 320, and eventually some of the photons may pass through the coating 312 of the movable mirror 320 and exit the filter 300. Note that because the coatings 312, 322 are associated with one-dimensional photonic band-gap structures the reflectivity of the mirrors 310, 320 may be increased (and thus, the finesse of the filter 300 may be improved).

In this way, the filter 300 may act as a narrow-band optical filter and the wavelength of light that exits the filter may vary over time (as d is varied). That is, the wavelength of light output from the filter 300 will scan back and forth across a range of the optical spectrum over time. By measuring the intensity of the light at various times (and, therefore, various distances d and wavelengths), information about the light entering the filter can be determined. Moreover, the presence of the coatings 312, 322 may provide highly reflective mirrors 310, 320 (e.g., 99%) and the filter 300 might be associated with, for example, a finesse of approximately 100.

Figure 8:
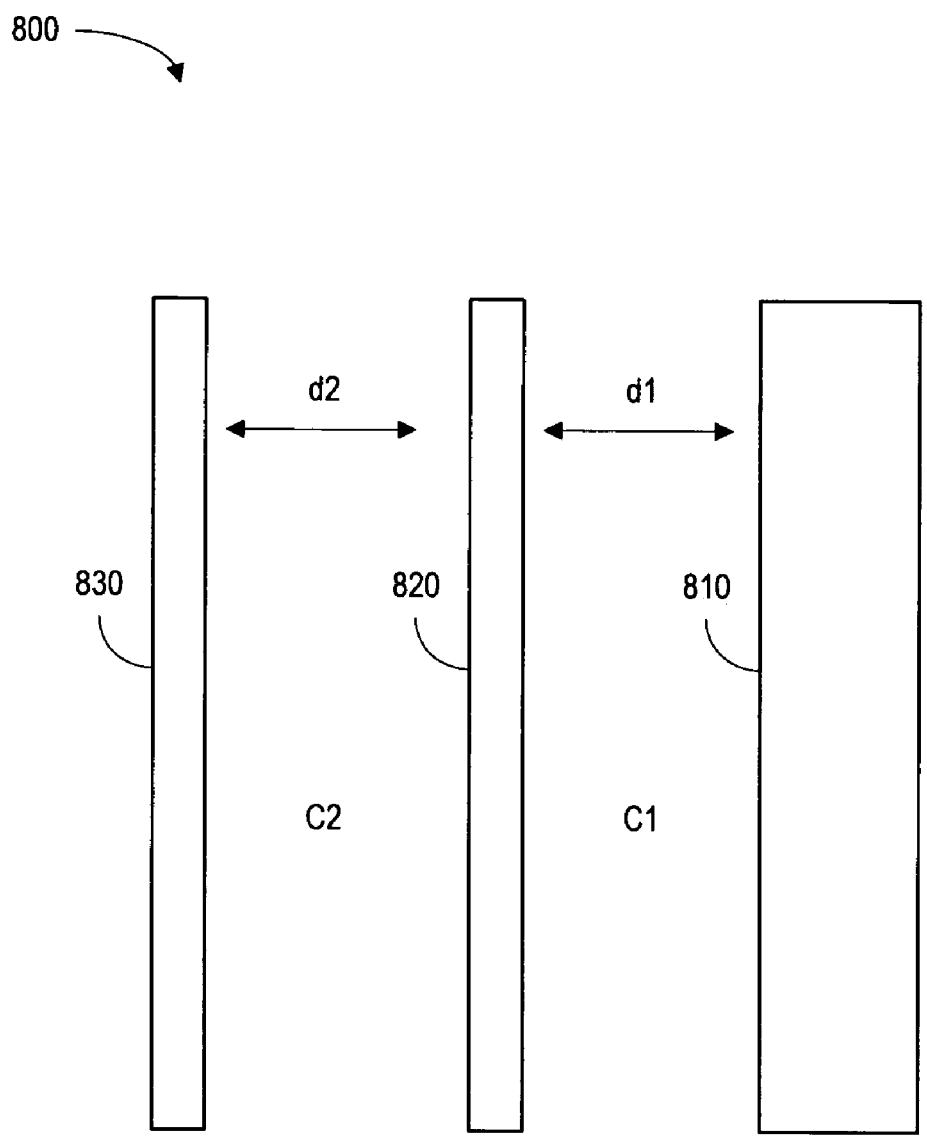
FIG. 8 is a side view of Fabry-Perot filters including unbalanced mirrors in accordance with an exemplary embodiment of the invention.

Although a single pair of mirrors 310, 320 are illustrated in FIG. 3, additional mirrors may be provided (e.g., to define multiple cavities as described with respect to FIG. 8). Moreover, although flat, rectangular mirrors 310, 330 are illustrated in FIG. 3 other configurations may be provided. For example, one or both of the mirrors 310, 320 might be curved. Similarly, one or both of the mirrors 310, 320 might be U-shaped or I-shaped.

The actuator 330 may be any element capable of moving the movable mirror 310. Note that the actuator 330 may be provided separate from the movable mirror 310. That is, the activation may be decoupled from the optics (e.g., the mirrors do not act as electrodes or movable membranes). As a result, the tunability of the filter 300 may be improved. In addition, the filter 300 may be scanned over longer distances and spatial (and therefore spectral) resolution may be increased. Also note that having the light enter the Fabry-Perot filter via the fixed mirror 320 (as opposed to the movable mirror 310) may reduce stiction issues and prevent fluctuations in any gap between a fiber optic cable and the filter 300.

According to some embodiments, the actuator 330 may be a bi-stable structure. In this case, the actuator 330 may be snapped between the two stable positions to scan the filter 300. The actuator 330 might be associated with, for example, a thermal device, an electrostatic device, and/or a magnetic device. According to some embodiments, a spring may be coupled to the movable mirror 310 and/or actuator 330 to improve control.

Figure 4:
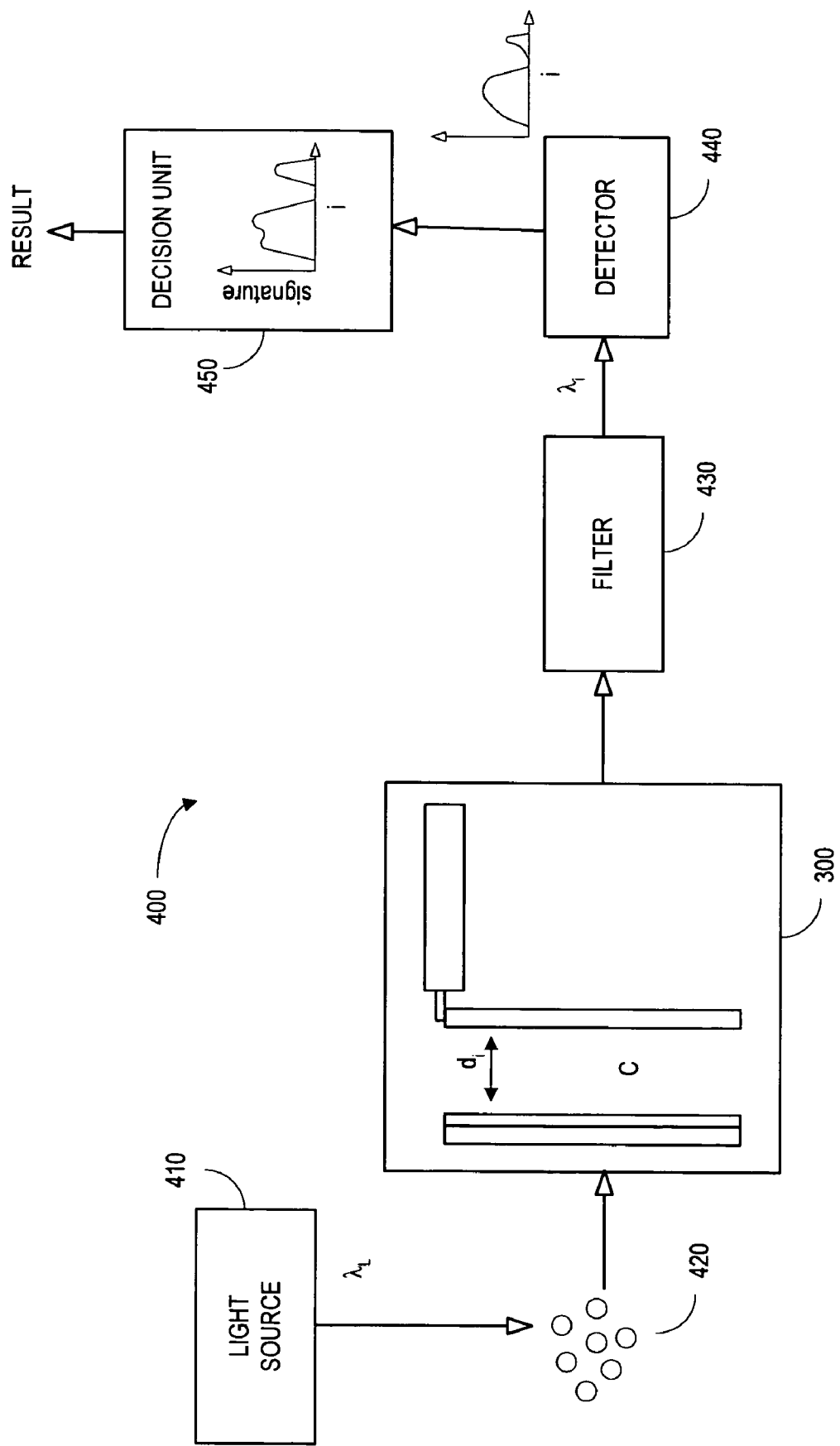
FIG. 4 illustrates a spectrometer according to some embodiments.

The Fabry-Perot filter 300 may be associated with, for example, a spectrometer. FIG. 4 illustrates a spectrometer 400 that might be associated with, for example, a Raman device, an infra-red absorption device, and/or a fluorescence spectroscopy device.

According to this embodiment, the spectrometer 400 includes a light source 410 (e.g., a laser associated with $\lambda_L$) that provides a beam of light to an analyte sample 420. Photons are reflected off of the analyte sample 420 and pass through the Fabry-Perot filter 300 as described, for example, with respect to FIG. 3. According to some embodiments, another filter 430 may also be provided (e.g., a Rayleigh filter to remove $\lambda_L$).

Because the Fabry-Perot filter 300 is scanning $d_i$ over time, a detector 440 may measure light having varying wavelengths $\lambda_L$ over time. These values may be provided to a decision unit 450 that compares the values with a signature of a known molecule (or sets of molecules) signatures. Based on the comparison, the decision unit 450 may output a result (e.g., indicating whether or not any of the signatures were detected).

The photonic band-gap structure (or structures) provided in the Fabry-Perot filter 300 may result in cavity mirrors having a reflectance of 99% and the filter 300 itself might have a finesse of more than 300. Such a spectrometer 400 might be associated with a resolution of less than 5 cm−1 and a tuning range of more than 100 nm.

Figure 5:
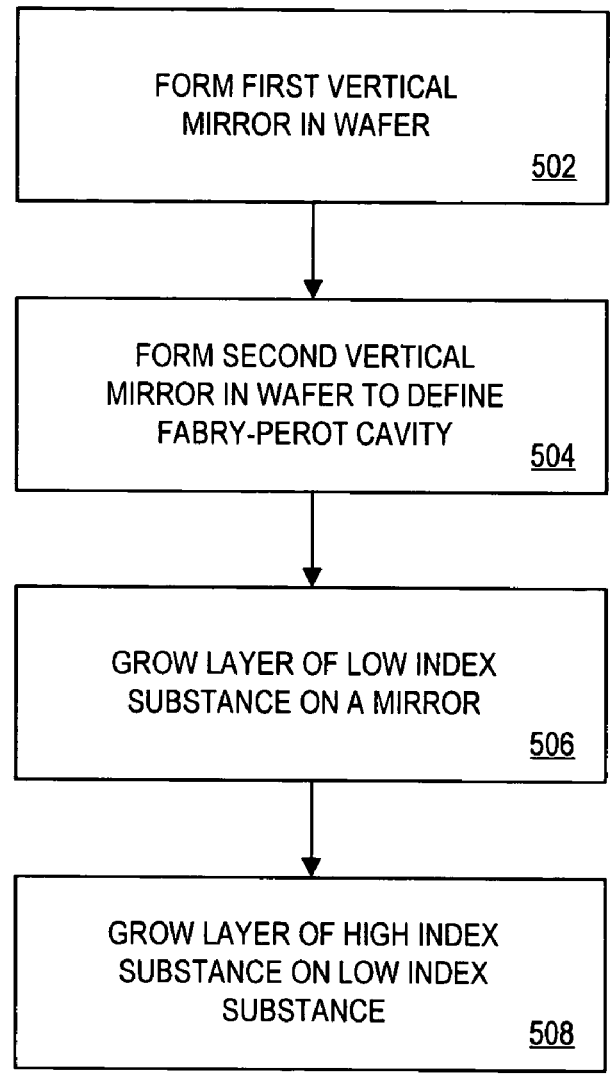
FIG. 5 illustrates a method associated with a Fabry-Perot filter cavity according to some embodiments.

FIG. 5 illustrates a method according to some embodiments. At Step 502, a first vertical mirror is formed in a wafer. At Step 504, a second vertical mirror is formed in the wafer, and the first and second vertical mirrors define a Fabry-Perot cavity. The wafer might be associated with, for example, a silicon substrate.

At Step 506, a layer of a relatively low index substance is grown for the first vertical mirror. At Step 508, a layer of a relatively high index substance is grown for the first vertical mirror (e.g., on top of the low index substance). As a result a Bragg mirror may be formed of these layers of relatively high and relatively low refractive index materials.

According to some embodiments, the relatively low index material is silicon oxide (with n being approximately 1.46) and the relatively high index material is silicon (with n being approximately 3.62). According to another embodiment, the relatively low index material is air (with n being 1) and the relatively high index material is silicon.

Figure 6:
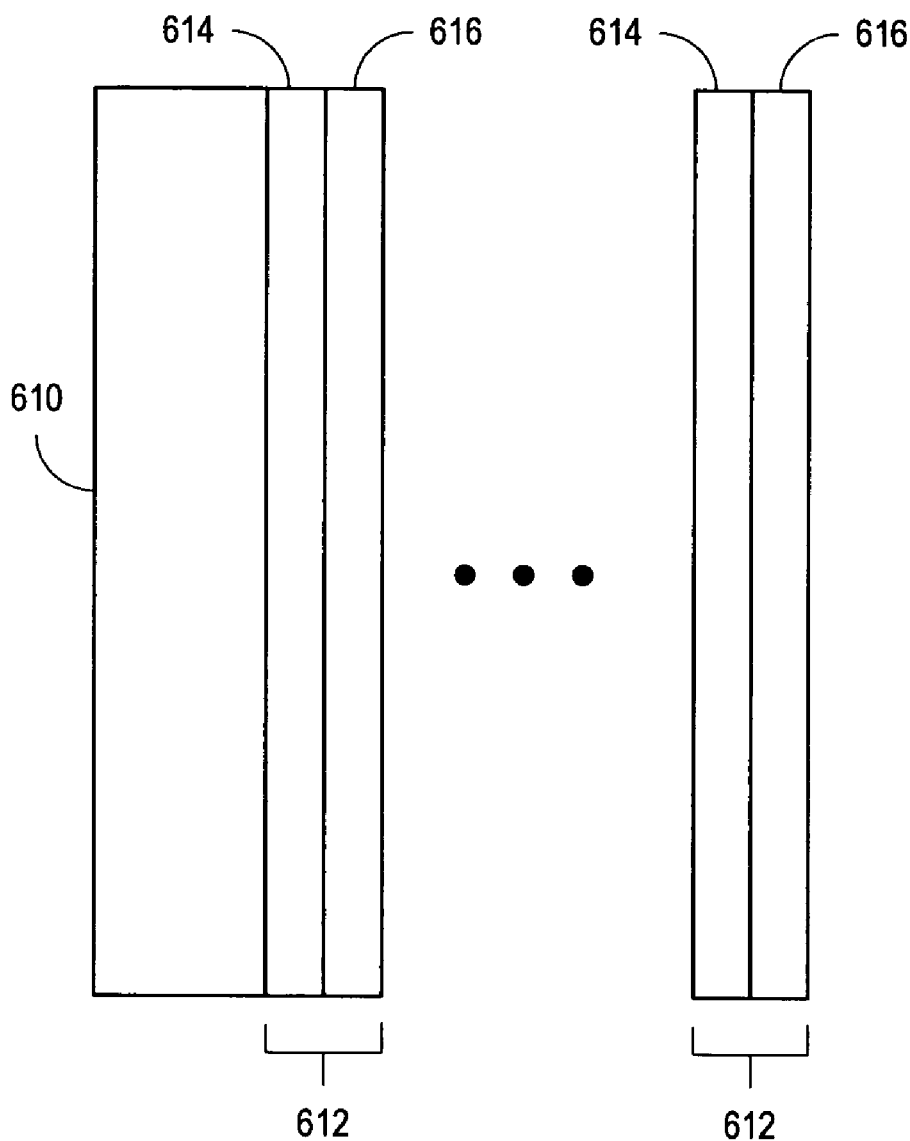
FIG. 6 is a top view of a Fabry-Perot filter in accordance with an exemplary embodiment of the invention.

Steps 506 and 508 may be repeated, according to some embodiments. For example, FIG. 6 illustrates multiple layers 612 of coating on a mirror 610. In this case, each layer includes a relatively low index material 614 and a relatively high index material 616. Note that the order of these materials 614, 616 might be reversed.

By way of example only, assume that the relatively low index material 614 is silicon oxide and the relatively high index material 616 is silicon. In this case, the reflectance of the mirror 600 might be approximately 68% when two layers 612 are present and 99% when four layers 612 are present. As another example, assume that the relatively low index material 614 is air and the relatively high index material 616 is silicon. In this case, the reflectance of the mirror 600 might be approximately 92% when a two layers 612 is present and 99% when three layers 612 are present.

Consider a Bragg mirror designed for light having a quarter wave optical thickness ($\lambda/4$) of 980 nm/4, or 245 nm. For this value, the actual thickness might be ($\lambda/4$)*n. Since n is approximately 3.62 for silicon, the physical thickness of a silicon layer 612 might be associated with approximately 886.9 nm.

Figure 7:
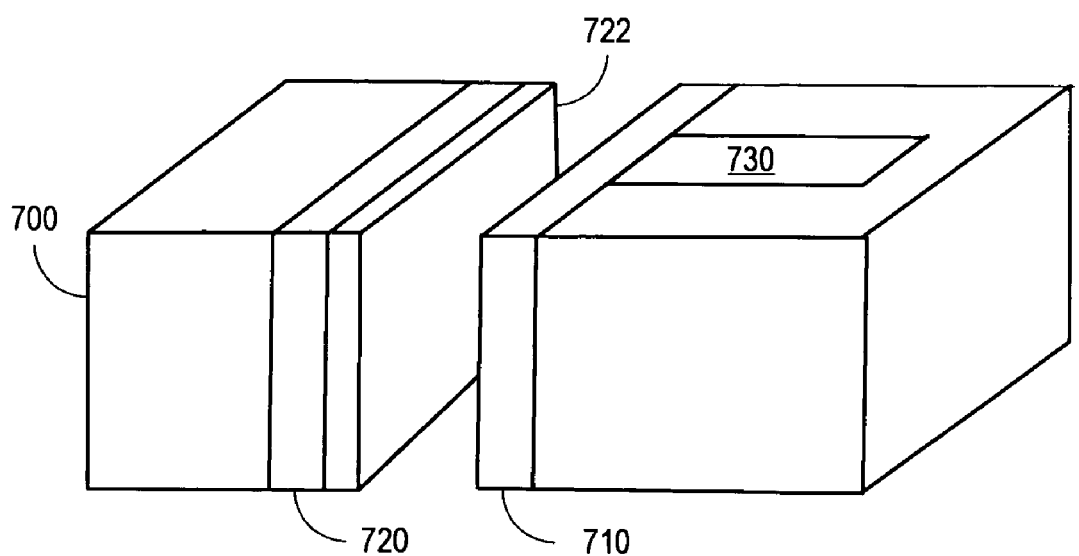
FIG. 7 is a perspective view of a wafer associated with a Fabry-Perot filter in accordance with an exemplary embodiment of the invention.

According to some embodiments, a movable or fixed mirror may be associated with a crystallographic plane of silicon and a Fabry-Perot filter may be associated with a Micro-electromechanical System (MEMS) device. For example, FIG. 7 is a perspective view of a wafer 700 that may be associated with a Fabry-Perot filter in accordance with an exemplary embodiment of the invention. In this case, portions of the wafer 700 may be etched away resulting in a pair of vertical mirrors 710, 720. Moreover, an actuation portion 730 may be etched onto the surface of the wafer 700 to move the movable mirror 710. Note that the vertical orientation of the mirrors 710, 720 might provide for taller, more stable structures as compared to horizontal ones. For example, a cavity 3 microns wide might be associated with mirrors having a height of 250 microns. According to some embodiments, areas are etched away and released by dry etching to avoid stiction issues that might result from drying wet surfaces.

Note that an optical coating 722 might be provided one or both mirrors 710, 720 to adjust reflection (and thereby increase transmission).

Instead of, or in addition to, using a coating 722 to improve the performance of a Fabry-Perot filter, according to some embodiments multiple Fabry-Perot filters and/or filter cavities may be provided. For example, FIG. 8 is a side view of a Fabry-Perot filter 800 having a first mirror 810 and a second mirror 820 that define a first cavity C1. According to this embodiment, a third mirror 830 is also provided to define a second cavity C2 between the second mirror 820 and the third mirror 830 to form a second cavity C2. The optical interference in the cavities may depend in part on the distances d1, d2 between the mirrors 810, 820, 830.

Figure 9:
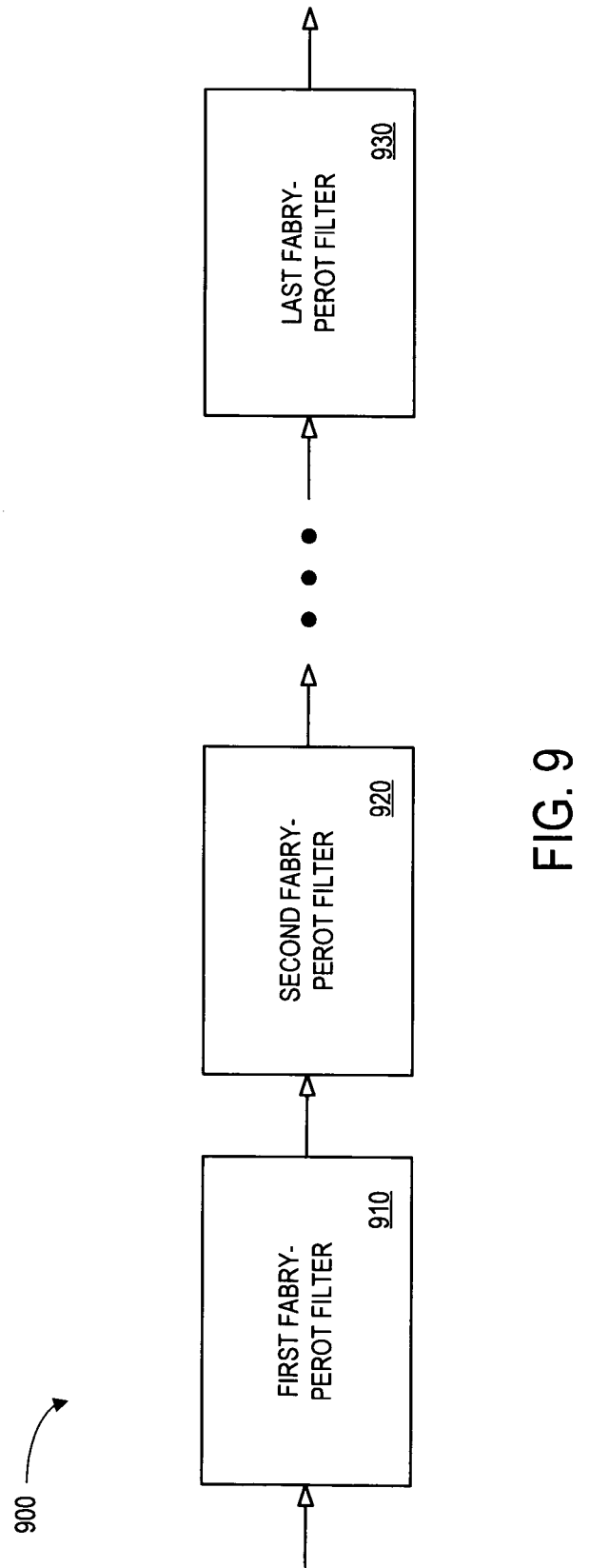
FIG. 9 illustrates multiple Fabry-Perot filters in accordance with some embodiments of the invention.

In this case, the cavities C1, C2 may act as a pair of Fabry-Perot filters. Note that more than two Fabry-Perot filters may be provided. For example, FIG. 9 illustrates a system 900 wherein photons pass through a first Fabry-Perot filter 910 and a second Fabry-Perot filter 920 and so on exiting a last Fabry-Perot 930.

Referring again to FIG. 8, note that the first mirror 810 may be formed substantially thicker as compared to the other mirrors 820, 830 resulting in an "unbalanced" mirror design. For example, a movable mirror 810 may be substantially thicker than fixed mirrors 820, 830. Such a design might, for example, improve the stability of the movable mirror 810 (e.g., reducing the problems caused by vibration of the Fabry-Perot filter 800) and/or increase an amount of light that is transmitted from the Fabry-Perot filter 800. Moreover, the movable mirror 810 might be less likely to flex or otherwise deform as it is scanned.

Figure 10:
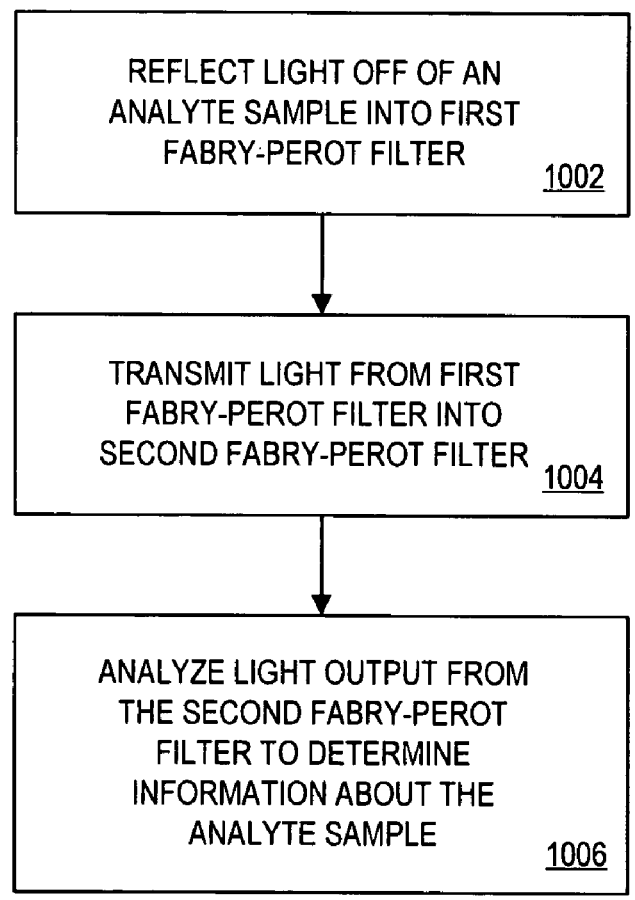
FIG. 10 illustrates a method associated with Fabry-Perot filter cavities according to some embodiments.

FIG. 10 illustrates a method associated with Fabry-Perot filter cavities according to some embodiments. At Step 1002, light is reflected from an analyte sample into a first Fabry-Perot filter formed in a silicon wafer. At Step 1004, light is transmitted from the first Fabry-Perot filter into a second Fabry-Perot filer formed in the silicon wafer. At step 1006, light output from the second Fabry-Perot filter is analyzed to determine information about the analyte sample. According to some embodiments, the method may further include moving a mirror associated with the first or second Fabry-Perot filter such that the light output from the second Fabry-Perot filter may be analyzed across an optical spectral range as described with respect to FIG. 12.

Figure 11:
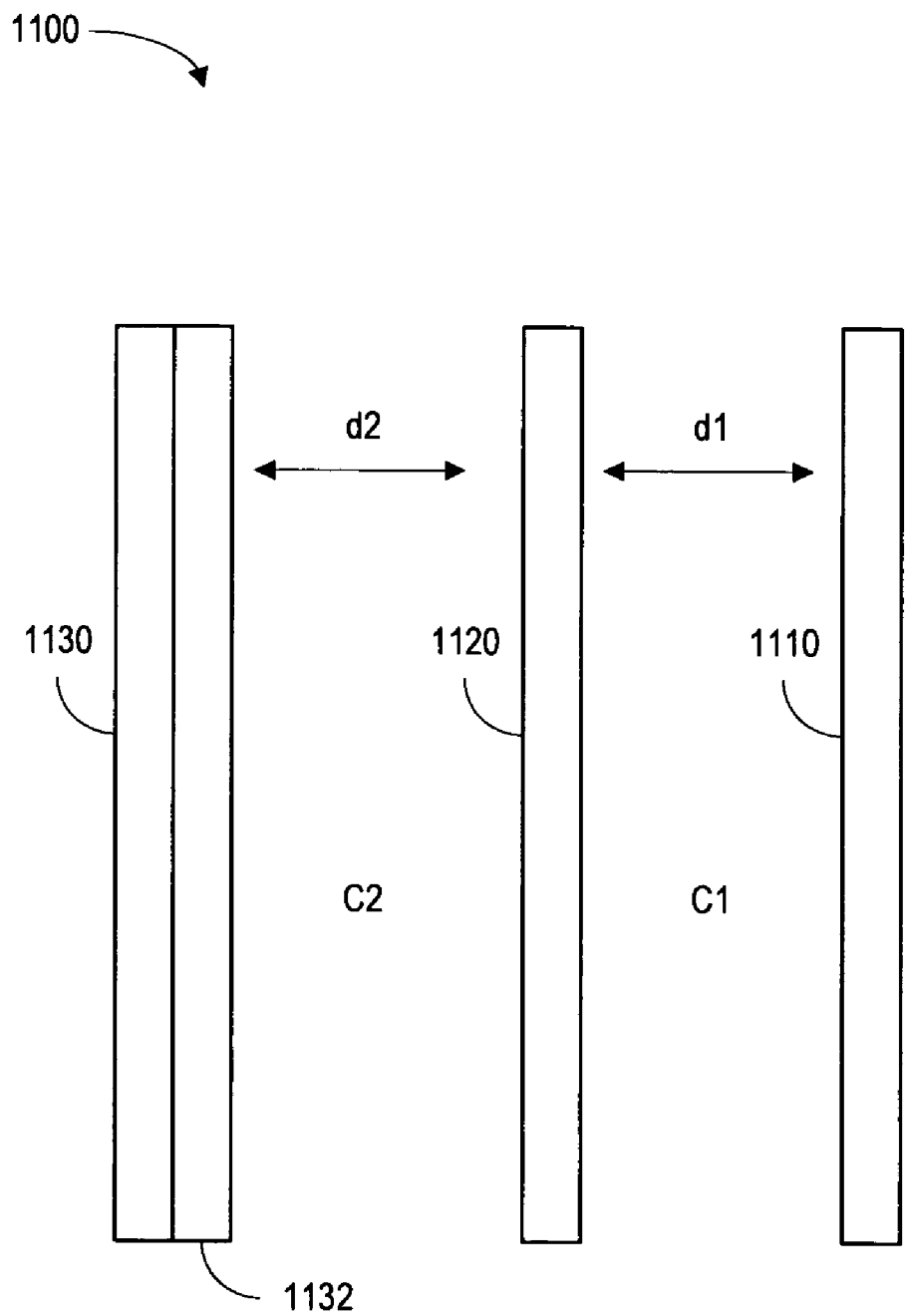
FIG. 11 is a side view of Fabry-Perot filters and at least one coating in accordance with an exemplary embodiment of the invention.

FIG. 11 is a side view of Fabry-Perot filter cavities C1, C2 formed by three partially reflecting mirrors 1110, 1120, 1130. In this case, one of the mirrors 1130 has a coating 1132 of a one-dimensional photonic band-gap structure. The coating 1132 might be associated with any of the embodiments described herein (e.g., with respect to FIGS. 1 through 7). According to some embodiments, one or more of the other mirrors 1110, 1120 may also be coated with a one-dimensional photonic band-gap structure. Moreover, the second mirror 1120 might have coatings on both surfaces.

Figure 12:
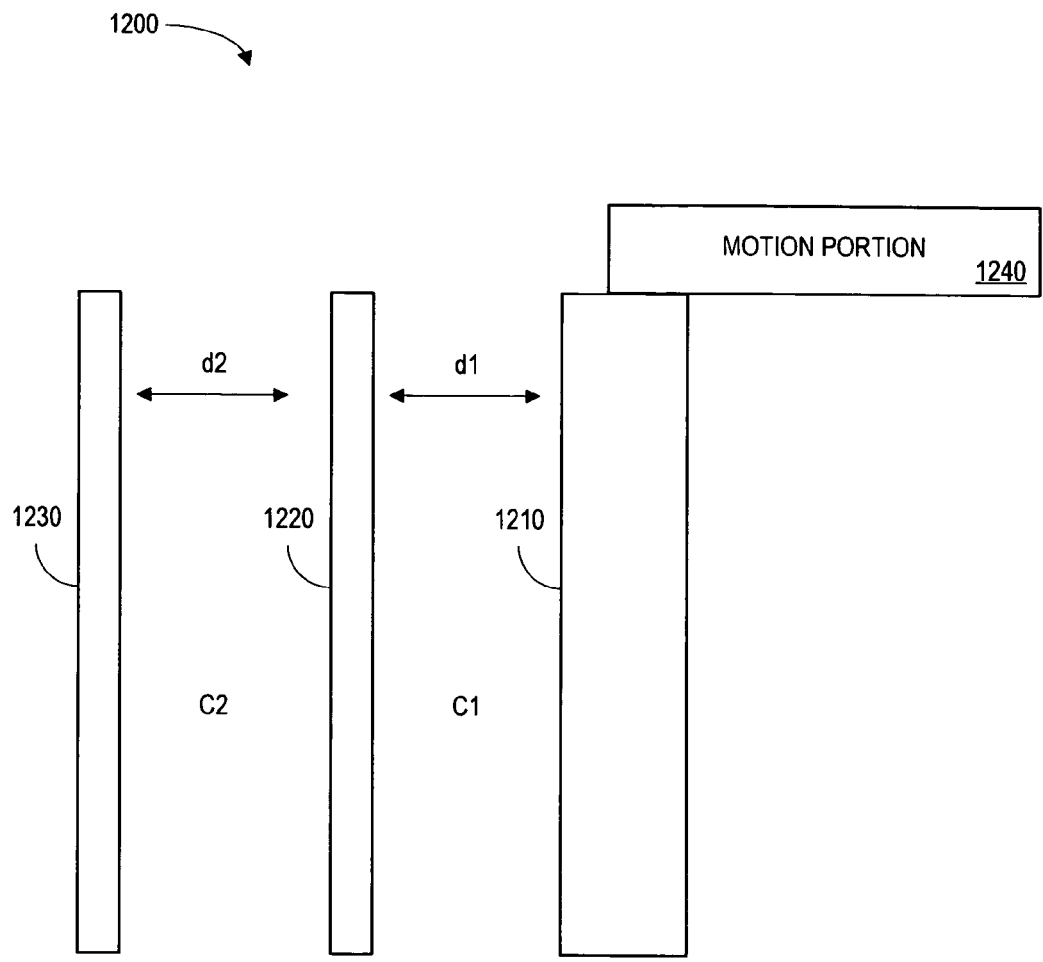
FIG. 12 is a side view of Fabry-Perot filters and at least one motion portion in accordance with an exemplary embodiment of the invention.

FIG. 12 is a side view of Fabry-Perot filters formed by three mirrors 1210, 1220, 1230 and at least one motion portion 1240 in accordance with an exemplary embodiment of the invention. In this case, the first mirror 1210 may be a movable mirror oriented substantially normal to a plane defined by a surface of a silicon wafer. The second mirror 1220 may also be oriented substantially normal to the plane defined by the surface of the silicon wafer. Moreover, the third mirror 1230 is also oriented substantially normal to the plane defined by the surface of the silicon wafer, and the second and third mirrors 1220, 1230 are substantially parallel to the movable mirror 1210. The moveable portion might comprise, for example, a comb drive (within the plane defined by the surface of the silicon wafer) to move the movable mirror 1210.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a single movable mirror has been provided in some embodiments described herein, note that both mirrors associated with a Fabry-Perot cavity might be movable (and each mirror might be simultaneously moved with respect to the other mirror).

Further, although particular coatings, layouts and manufacturing techniques have been described herein, embodiments may be associated with other coatings, layouts and/or manufacturing techniques. For example, cap wafers with optical and/or electrical ports may be provided for any of the embodiments described herein. Such wafers may, for example, be used to interface with an Application Specific Integrated Circuit (ASIC) device.

Moreover, although Fabry-Perot filter designs have been described with respect to spectrometers, note that such filters may be used with any other types of devices, including telecommunication devices, meteorology devices, and/or pressure sensors.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A micro-electrical mechanical system apparatus, comprising:
   a movable partially reflecting mirror;
   a fixed partially reflecting mirror, wherein the movable and fixed mirrors together define a cavity between the mirrors, and further wherein the mirrors are each oriented to reflect light in a direction substantially parallel to upper and lower planar surfaces of a wafer to further define the cavity between the mirrors, and further wherein the cavity is variable in size in a direction substantially parallel to the upper and lower planar surfaces, and further wherein each mirror is disposed within the wafer such that light passes through the fixed partially reflecting mirror to enter the cavity between the mirrors; and
   a photonic band-gap structure on a surface of at least one of the movable or fixed mirrors, the photonic band-gap structure comprising alternate layers of relatively high refractive index materials and air, wherein the layers together are configured to achieve a desired level of finesse for a corresponding Fabry-Perot filter.

2. The apparatus of claim 1, wherein at least one of the movable or fixed mirrors is associated with a crystallographic vertical plane of silicon relative to the planes defined by the upper and lower planar surfaces of a silicon wafer.

3. The apparatus of claim 2, further comprising:
   an actuator within the plane defined by the upper planar surface of the silicon wafer, wherein the actuator is configured to move the movable mirror.

4. The apparatus of claim 1, wherein the photonic band-gap structure is a one-dimensional photonic band-gap structure and the space between the movable and fixed mirrors is a Fabry-Perot filter cavity.

5. The apparatus of claim 4, wherein the photonic band-gap structure is associated with at least one Bragg mirror formed of alternate layers of relatively high and relatively low refractive index materials.

6. The apparatus of claim 5, wherein a distance associated with the photonic band-gap structure represents substantially a quarter wave optical thickness value.

7. The apparatus of claim 4, wherein the reflection of the mirror having the photonic band-gap structure is substantially 99%.

8. The apparatus of claim 1, wherein the apparatus is associated with at least one of: (i) a telecommunication device, (ii) a meteorology device, or (iii) a pressure sensor.

9. A method, comprising:
   forming a fixed vertical partially reflecting mirror in a wafer, the fixed mirror having a reflecting surface oriented to reflect light in a direction substantially parallel to upper and lower planar surfaces of the wafer;
   forming a movable vertical mirror in the wafer, the movable mirror having a reflecting surface oriented to reflect light in a direction substantially parallel to the upper and lower planar surfaces of the wafer, the fixed and movable vertical mirrors defining a Fabry-Perot cavity there between within the wafer, wherein the cavity size is variable in a direction substantially parallel to the upper and lower planar surfaces of the wafer;
   growing a layer of a relatively low index substance for the fixed vertical mirror; and
   growing a layer of a relatively high index substance for the fixed vertical mirror, such that the layers together are configured to achieve a desired level of finesse for a corresponding Fabry-Perot filter, wherein light passes through the fixed partially reflecting mirror to enter the cavity between the mirrors, and further wherein growing a layer of a relatively low index substance and growing a layer of a relatively high index substance is repeated to form a photonic band-gap structure comprising alternating layers of relatively high refractive index material and air.

10. A micro-electrical mechanical system apparatus, comprising:
    a fixed mirror;
    a movable mirror; wherein the fixed and movable mirrors each includes a partially reflecting surface within a wafer to define a first cavity there between within the wafer;
    a third mirror configured with a partially reflecting surface within the wafer, the third mirror configured together with the fixed mirror or the movable mirror to define a second cavity there between within the wafer, wherein the partially reflecting surfaces are configured to reflect light in a direction substantially parallel to upper and lower planar surfaces of the wafer, and further wherein at least one cavity size is variable in a direction substantially parallel to the upper and lower planar surfaces of the wafer, such that light passes through the fixed partially reflecting mirror to enter the first and second cavities between the mirrors; and
    a one-dimensional photonic band-gap structure on a surface of at least one of the fixed, movable, or third mirrors, the band-gap structure comprising alternate layers of relatively high refractive index materials and air to achieve a desired level of finesse for a corresponding Fabry-Perot filter.

11. The apparatus of claim 10, wherein at least one of the fixed, movable, or third mirrors is associated with a crystallographic vertically inclined plane of silicon that is oriented substantially normal to the upper and lower planar surfaces of the wafer.

12. The apparatus of claim 10, further comprising:
an actuator within the plane defined by the upper planar surface of the wafer, such that the actuator is disposed within the wafer, and wherein the actuator is configured to move the movable mirror in a direction parallel to the upper and lower planar surfaces of the wafer.

13. The apparatus of claim 10, wherein the space between the fixed and movable mirrors is a first Fabry-Perot filter cavity and the space between the third mirror and the other mirror defining the second cavity is a second Fabry-Perot filter cavity.

14. A method, comprising:
reflecting light off of an analyte sample into a first Fabry-Perot filter formed in a silicon wafer, the first Fabry-Perot filter comprising a first cavity;
transmitting light from the first Fabry-Perot filter into a second Fabry-Perot filter formed in the silicon wafer, the second Fabry-Perot filter comprising a second cavity;
an actuator disposed within the silicon wafer and configured to vary the width of the first or second Fabry-Perot filter cavity in a direction substantially parallel to a non-arcuate planar surface of the silicon wafer such that the wavelength of light that exits the second Fabry-Perot filter varies over time, and further such that light entering the first and second Fabry-Perot filters passes through a fixed partially reflecting mirror comprising a one-dimensional photonic band-gap structure comprising alternate layers of relatively high refractive index materials and air to achieve a desired level of finesse for the first Fabry-Perot filter; and
analyzing light output from the second Fabry-Perot filter to determine information about the analyte sample.

15. The method of claim 14, further comprising:
moving a mirror associated with the first or second Fabry-Perot filter in a direction substantially parallel to the non-arcuate planar surface of the silicon wafer such that the light output from the second Fabry-Perot filter may be analyzed across an optical spectral range.

16. A spectrometer, comprising:
a laser source;
an analyte sample to reflect light from the laser source;
a Fabry-Perot filter cavity disposed within a wafer and configured to receive the reflected light, including
an actuator disposed within the wafer, the wafer comprising upper and lower planar surfaces,
at least one movable mirror comprising a partially reflecting surface oriented to reflect light in a direction substantially parallel to the upper and lower planar surfaces, wherein the actuator is configured to move the at least one movable mirror in a direction substantially parallel to the upper and lower planar surfaces,
a fixed mirror comprising a partially reflecting surface oriented to reflect light in a direction substantially parallel to the upper and lower planar surfaces, the fixed mirror oriented substantially parallel to the movable mirror such that light enters the Fabry-Perot filter cavity via the fixed mirror, and
a one-dimensional photonic band-gap structure on a surface of at least one of the movable or fixed mirrors, the one-dimensional photonic band-gap structure comprising alternate layers of relatively high refractive index materials and air to achieve a desired level of finesse for a corresponding Fabry-Perot filter;
a detector to detect photons exiting the Fabry-Perot filter cavity over time as the movable mirror is moved by the actuator; and
a decision unit to determine if the analyte sample is associated with at least one type of molecule based on the detected photons.

* * * * *